(12) United States Patent
Hacker et al.

(10) Patent No.: US 8,364,377 B2
(45) Date of Patent: Jan. 29, 2013

(54) METHOD AND DEVICE FOR DETERMINING THE COMBUSTION LAMBDA VALUE OF AN INTERNAL COMBUSTION ENGINE

(75) Inventors: Frank Hacker, Regenstauf (DE); Gerhard Haft, Obermotzing (DE)

(73) Assignee: Continental Automotive GmbH, Hannover (DE)

( * ) Notice: Subject to any disclaimer, the term of this patent is extended or adjusted under 35 U.S.C. 154(b) by 739 days.

(21) Appl. No.: 12/598,944

(22) PCT Filed: Mar. 20, 2008

(86) PCT No.: PCT/EP2008/053427
§ 371 (c)(1),
(2), (4) Date: Nov. 5, 2009

(87) PCT Pub. No.: WO2008/135312
PCT Pub. Date: Nov. 13, 2008

(65) Prior Publication Data
US 2010/0138135 A1    Jun. 3, 2010

(30) Foreign Application Priority Data
May 7, 2007 (DE) .......................... 10 2007 021 283

(51) Int. Cl.
G06F 19/00 (2011.01)
G06G 7/70 (2006.01)
F02P 5/00 (2006.01)

(52) U.S. Cl. .................. 701/102; 701/111; 123/406.27; 123/406.29

(58) Field of Classification Search ............. 123/406.26, 123/406.27, 406.29, 673, 679, 406.45, 406.47; 701/101, 102, 115, 111; 73/35.09
See application file for complete search history.

(56) References Cited

U.S. PATENT DOCUMENTS

| 5,433,107 A | 7/1995 | Angermaier et al. |
| 5,690,072 A * | 11/1997 | Meyer et al. ................... 123/436 |
| 6,125,691 A | 10/2000 | Hohner et al. |
| 6,550,312 B1 | 4/2003 | Hohner et al. |
| 7,027,910 B1 | 4/2006 | Brown et al. |
| 7,483,782 B2 | 1/2009 | Corde et al. |

(Continued)

FOREIGN PATENT DOCUMENTS

| DE | 19735454 A1 | 2/1999 |
| DE | 19911019 A1 | 9/2000 |
| DE | 10304242 B3 | 4/2004 |
| EP | 0576705 A1 | 1/1994 |
| EP | 1729001 A1 | 2/2006 |

OTHER PUBLICATIONS

International PCT Search Report, PCT/EP2008/053427, 11 pages, Mailed Oct. 7, 2008.

(Continued)

*Primary Examiner* — Stephen K Cronin
*Assistant Examiner* — Sizo Vilakazi
(74) *Attorney, Agent, or Firm* — King & Spalding L.L.P.

(57) ABSTRACT

In a method and a device which allow determination of the combustion lambda value of an internal combustion engine having at least two combustion chambers without using a lambda sensor, a predetermined first fuel quantity is metered to the first combustion chamber and a predetermined second fuel quantity is metered to the second combustion chamber, the first fuel quantity is reduced by a predetermined amount and the second fuel quantity is increased by the same predetermined amount. A first engine noise, associated with the first combustion chamber, and a second engine noise, associated with the second combustion chamber, are determined. The combustion lambda value is determined based on the first engine noise value and second engine noise value.

18 Claims, 6 Drawing Sheets

U.S. PATENT DOCUMENTS

2002/0043247 A1 4/2002 Majima
2005/0120786 A1* 6/2005 Tsujimura et al. .......... 73/119 R
2006/0271271 A1 11/2006 Corde et al.
2007/0084192 A1* 4/2007 Wanibe ........................... 60/274
2008/0035132 A1* 2/2008 Katoh et al. .................. 123/673

OTHER PUBLICATIONS

German Office Action, German application No. 10 2007 021 283.8-26, 4 pages, Nov. 30, 2007.

* cited by examiner

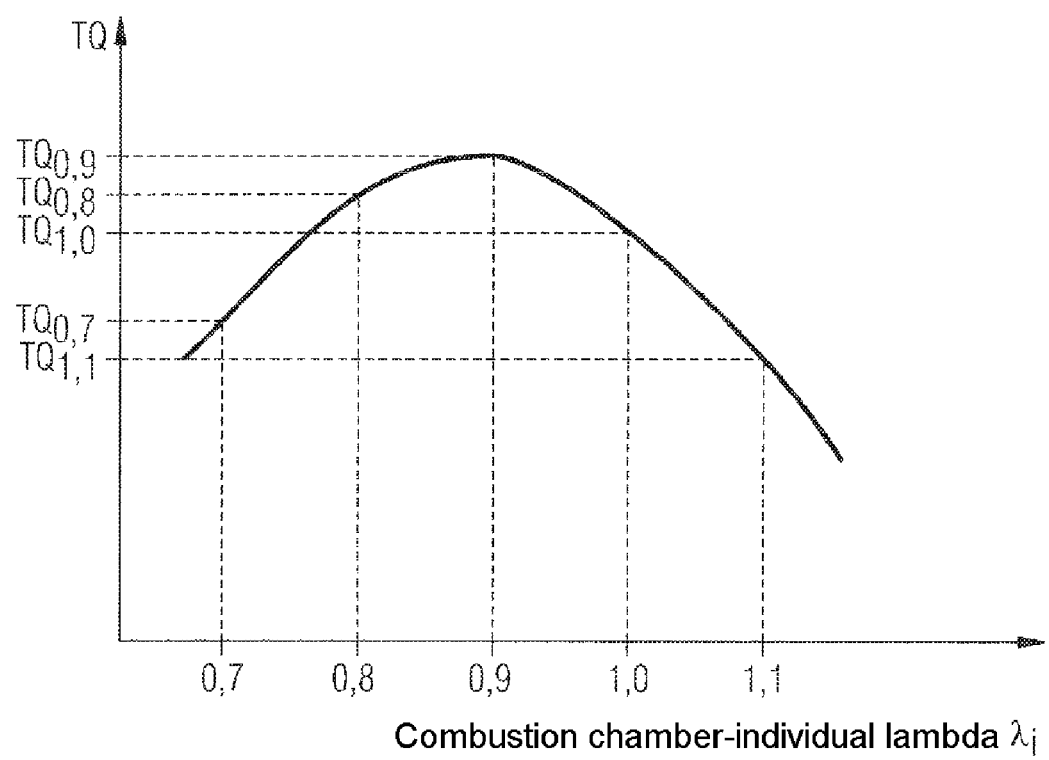

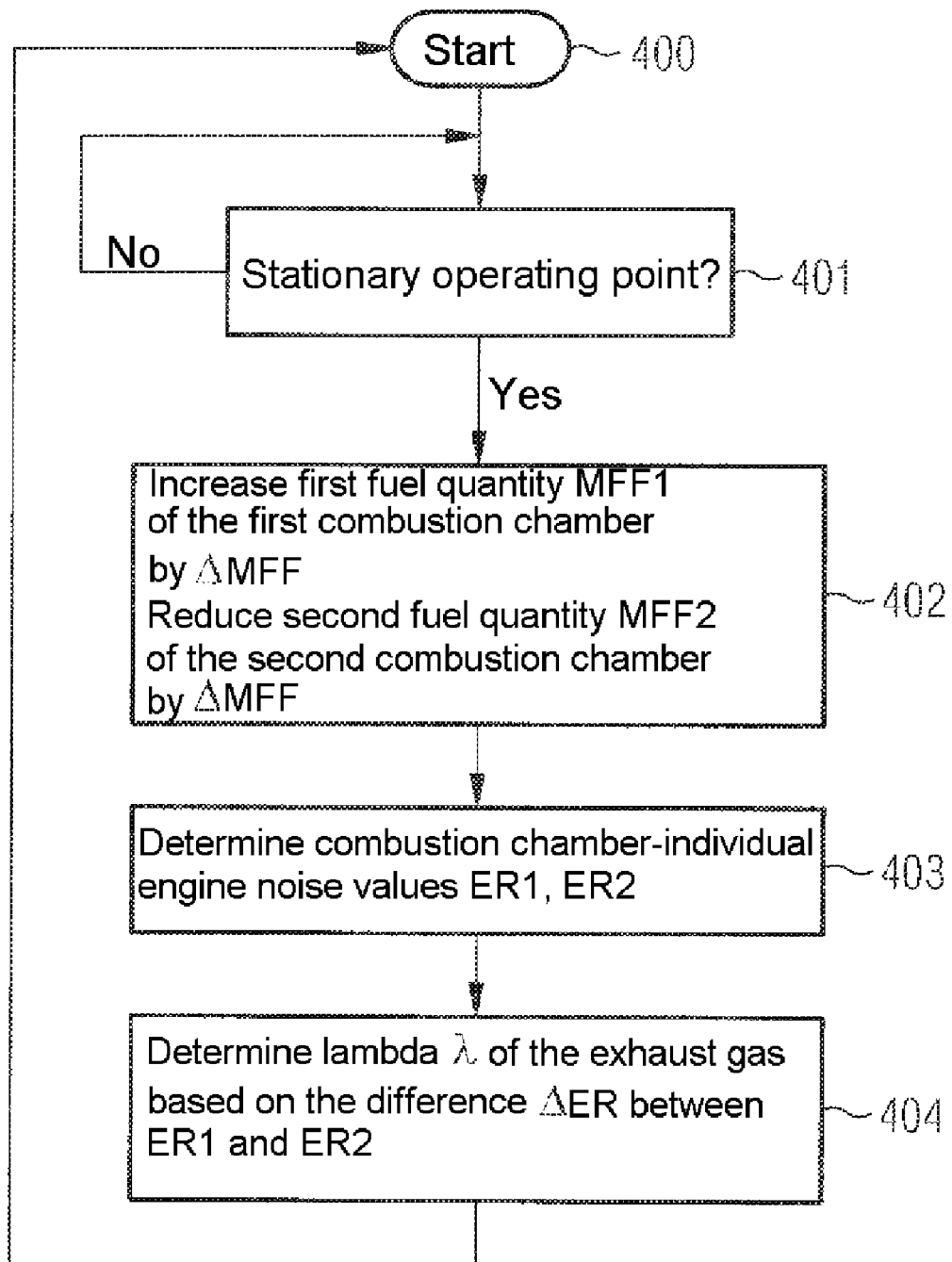

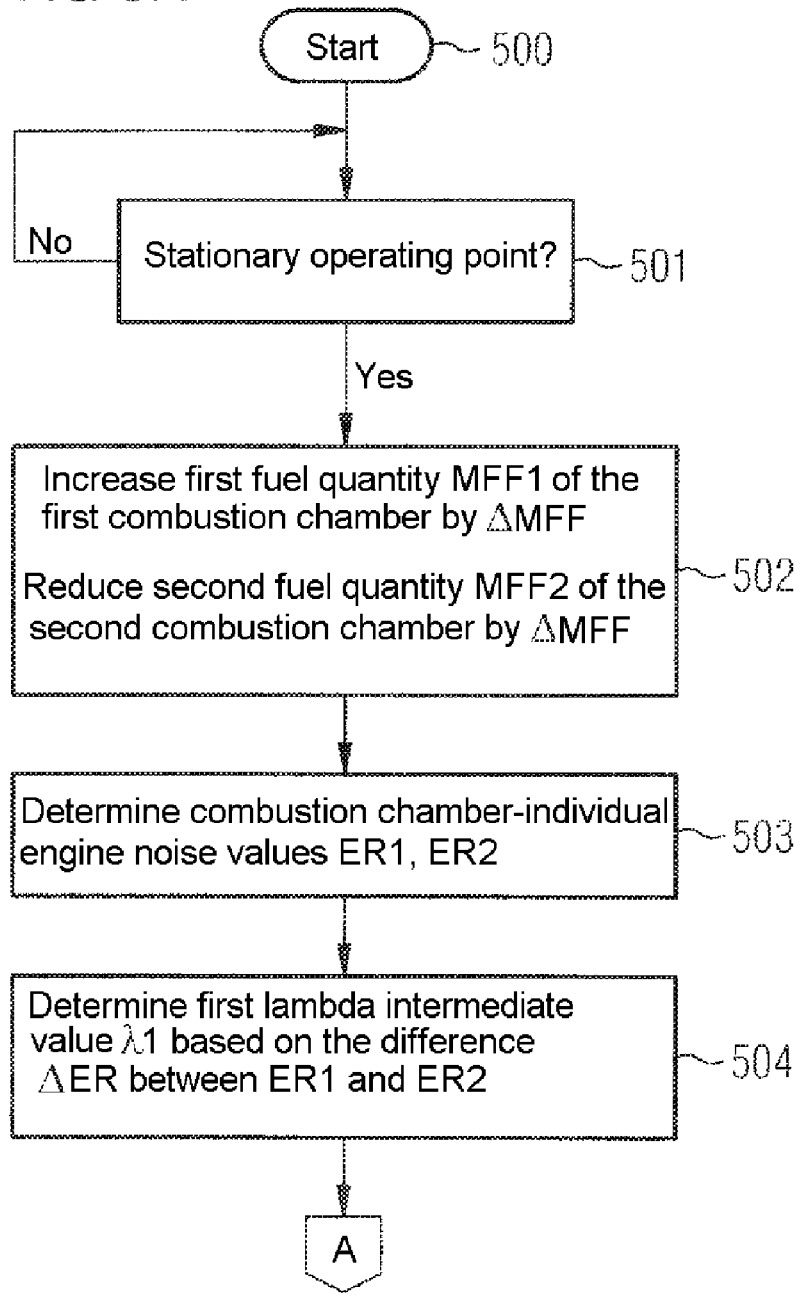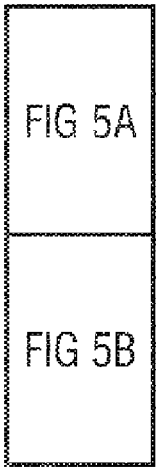

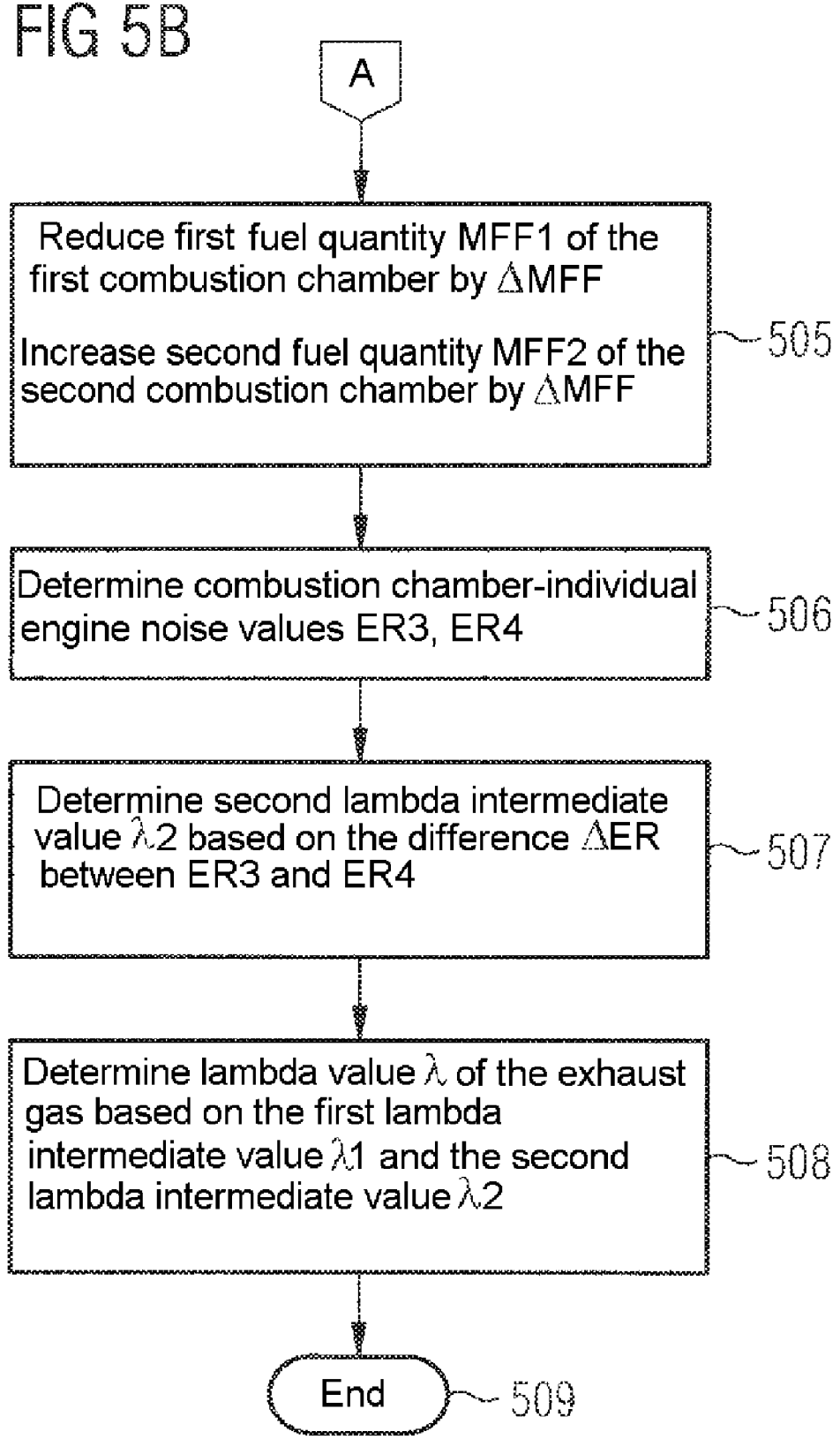

METHOD AND DEVICE FOR DETERMINING THE COMBUSTION LAMBDA VALUE OF AN INTERNAL COMBUSTION ENGINE

CROSS-REFERENCE TO RELATED APPLICATIONS

This application is a U.S. National Stage Application of International Application No. PCT/EP2008/053427 filed Mar. 20, 2008, which designates the United States of America, and claims priority to German Application No. 10 2007 021 283.8 filed May 7, 2007, the contents of which are hereby incorporated by reference in their entirety.

TECHNICAL FIELD

The invention relates to a method for determining the combustion lambda value of an internal combustion engine as well as a control device which is embodied in such a way that it can carry out the method.

BACKGROUND

In order to adhere to increasingly stricter exhaust gas specifications, most motor vehicles are nowadays equipped with an exhaust gas purifying catalytic converter. However, the optimal purification efficiency of the catalytic converter is only achieved in the case of a specific air/fuel ratio of the induction mixture. In order to adjust the air/fuel ratio, at least one lambda sensor is arranged in the exhaust gas duct of the motor vehicle. However, lambda sensors have a number of disadvantages.

Therefore, a reliable signal of the lambda sensor can only be obtained after the operating temperature of approximately 800 to 900° C. has been reached. As a result, the lambda sensor must, after starting of the internal combustion engine, be heated to this operating temperature by means of a heating device that has specially been provided. Therefore it is impossible to control the air/fuel ratio until the operating temperature has been reached, which leads to an increased discharge of harmful substances during the running-up phase.

Furthermore, when using inexpensive, binary lambda sensors, the determination of a defined lambda value of the exhaust gas is not possible because a binary sensor only allows a qualitative statement about the composition of the exhaust gas. Although linear lambda sensors do allow a quantitative determination of the combustion lambda value, they are far more expensive than binary lambda sensors.

In the case of motor vehicles which can optionally be operated by means of different types of fuel such as for example gasoline and alcohol, the combustion lambda value can, as a rule, only be determined by means of a lambda sensor during operation with one of the two fuel types.

As explained above, the use of lambda sensors is subject to strict restrictions.

SUMMARY

According to various embodiments, a device and a method can be created by means of which a determination of the combustion lambda value of an internal combustion engine is possible even without the use of a lambda sensor.

According to an embodiment, a method for the determination of the combustion lambda value of an internal combustion engine with at least two combustion chambers, with the may comprise the steps of: metering a predetermined first fuel quantity to the first combustion chamber and a predetermined second fuel quantity to the second combustion chamber, reducing the first fuel quantity by a predetermined amount and increasing the second fuel quantity by the same predetermined amount, determining a first engine noise value, associated with the first combustion chamber, and a second engine noise value, associated with the second combustion chamber, and determining the combustion lambda value based on the first engine noise value and the second engine noise value.

According to a further embodiment, the combustion lambda value of the exhaust gas can be determined based on the difference between the first engine noise value and the second engine noise value. According to a further embodiment, after the determination of the first engine noise value and the second engine noise value, the first fuel quantity being increased by the predetermined amount and the second fuel quantity being decreased by the predetermined amount, a third engine noise value, associated with the first combustion chamber, and a fourth engine noise value, associated with the second combustion chamber, being determined, and the combustion lambda value being determined based on the first engine noise value, the second engine noise value, the third engine noise value and the fourth engine noise value. According to a further embodiment, a first lambda intermediate value may be determined based on the difference between the first engine noise value and the second engine noise value, a second lambda intermediate value may be determined based on the difference between the third engine noise value and the fourth engine noise value, and the combustion lambda value may be determined based on the first lambda intermediate value and the second lambda intermediate value. According to a further embodiment, the lambda value of the exhaust gas can be calculated as the average value between the first lambda intermediate value and the second lambda intermediate value. According to a further embodiment, the combustion lambda value can be determined by using at least one performance graph.

According to another embodiment, a control device for an internal combustion engine may comprise at least two combustion chambers, wherein the control device, in order to determine the combustion lambda value of the internal combustion engine, may be operable to meter a predetermined first fuel quantity to the first combustion chamber and a predetermined second fuel quantity to the second combustion chamber, to reduce the first fuel quantity by a predetermined amount and to increase the second fuel quantity by the same predetermined amount, to determine a first engine noise value, associated with the first combustion chamber, and a second engine noise value, associated with the second combustion chamber, and to determine the combustion lambda value based on the first engine noise value and the second engine noise value.

BRIEF DESCRIPTION OF THE DRAWINGS

The invention is described in more detail below with reference to the exemplary embodiments specified in the attached schematic figures of the drawing, in which;

FIG. 2 shows a diagram representing the dependence of the generated torque produced on the air/fuel ratio;

FIG. 4 shows a first exemplary embodiment of a method in the form of a flow diagram;

FIGS. 5, 5A-5B shows a second exemplary embodiment of a method in the form of a flow diagram.

FIG. 1 is a schematic representation of an internal combustion engine 1. For reasons of improved clarity, the diagram is greatly simplified.

DETAILED DESCRIPTION

Figure 1:
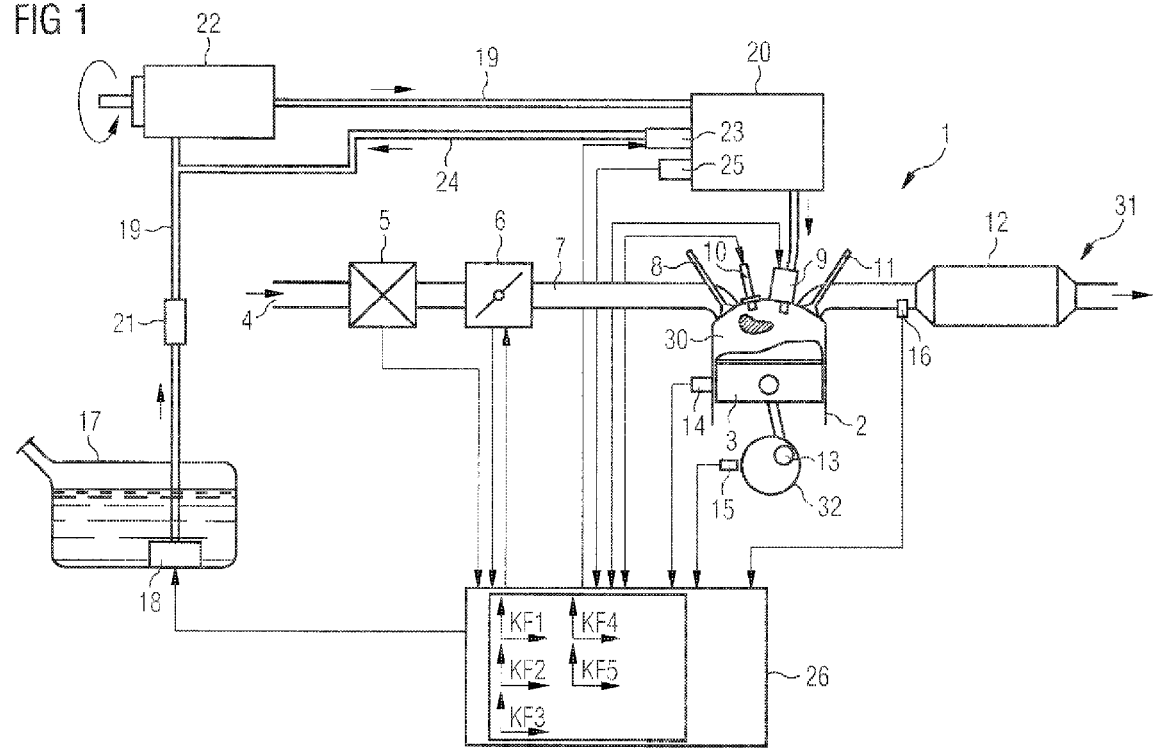
FIG. 1 shows a schematic representation of an internal combustion engine.

A method in accordance to an embodiment refers to an internal combustion engine having at least two combustion chambers. According to the method, a predetermined first fuel quantity is metered to the first combustion chamber and a predetermined second fuel quantity is metered to the second combustion chamber. The first fuel quantity is reduced by a predetermined amount and the second fuel quantity is increased by the same predetermined amount. In that way, the total amount of fuel fed from the first combustion chamber and from the second combustion chamber essentially remains constant. Subsequently, a first engine noise value, associated with the first combustion chamber, and a second engine noise value, associated with the second combustion chamber, are determined. The combustion lambda value is then determined based on the first engine noise value and the second engine noise value.

The torque generated in each combustion chamber depends on the combustion chamber-individual air/fuel ratio. Known methods allow the determination of a combustion-chamber individual engine noise of the internal combustion engine, which is caused by the different torque contributions of the individual combustion chambers of the internal combustion engine. Such a method is for example described in EP 0 576 705 A1. As a result, an engine noise value within the meaning of the invention is any value which represents a standard for the individual torque contribution of the individual combustion chambers. If a certain quantity of fuel quantity is distributed between the combustion chambers of the internal combustion, an initially unknown combustion lambda value is obtained by the combustion of this fuel quantity. If the combustion chamber-individual fuel quantity of one of the combustion chambers is now reduced by a predetermined amount and at the same time, the combustion chamber-individual fuel quantity of another combustion chamber is increased by the same amount, the torque contributions of the combustion chambers differ because of the different combustion chamber-individual air/fuel ratios. These different torque contributions lead to different engine noise values for each combustion chamber. However, the pattern of the combustion chamber-individual engine noise values is characteristic for a certain combustion lambda value. As a result, a corresponding evaluation of the combustion chamber-individual engine noise values makes it possible to arrive at a conclusion about the combustion lambda value. This method makes it possible to determine the combustion lambda value of the internal combustion engine without using a lambda sensor. This results in a considerably more flexible and lower-cost method for determining the lambda value.

In an embodiment of the method, the combustion lambda value is determined based on the difference between the first engine noise value and the second engine noise value.

By determining the difference between the first engine noise value and the second engine noise value, the ratio of the two engine noise values to each other can easily be shown. This simplifies the determination of the lambda value, by using performance graphs for example.

In a further embodiment of the method, after the determination of the first engine noise value and the second engine noise value, the first fuel quantity is increased by the predetermined amount and the second fuel quantity is reduced by the predetermined amount. Subsequently, a third engine noise value, which is associated with the first combustion chamber and a fourth engine noise value, which is associated with the second combustion chamber, are determined. The combustion lambda value is then determined based on the first engine noise value, the second engine noise value, the third engine noise value and the fourth engine noise value.

This embodiment of the method proves to be particularly advantageous when the fuel quantities metered to the combustion chambers differ because of a combustion chamber-individual fuel quantity adjustment. Known methods make it possible to adjust the fuel metered to the combustion chambers in such a manner that the combustion chamber-individual torque contributions are approximately equal. In this case, in order to increase the accuracy for the determination of the combustion lambda value, two engine noise values are determined for each combustion chamber, which are obtained by reducing and increasing the metered fuel quantity by the same amount in each case. By evaluating the pattern of these engine noise values, the combustion lambda value can thus be determined with higher accuracy.

In yet a further embodiment of the method i, a first lambda intermediate value based on the difference between the first engine noise value and the second engine noise value is determined and a second lambda intermediate value based on the difference between the third engine noise value and the fourth engine noise value is determined. The combustion lambda value is then determined based on the first lambda intermediate value and the second lambda intermediate value.

In an analogous manner to one of the above embodiments, a more simple determination of the lambda value is obtained by determining the differences between the relevant lambda intermediate values.

In accordance with yet a further embodiment of the method, the combustion lambda value is calculated as an average value between the first lambda intermediate value and the second lambda intermediate value.

This embodiment of the method makes it possible to further simplify the determination of the lambda value with sufficient accuracy.

In accordance with yet a further embodiment of the method, the lambda value is determined by using at least one performance graph.

The use of performance graphs for determining the lambda value makes it possible to incorporate this method in an engine control based on a performance graph with little additional effort.

A control device can be embodied in such a way according to another embodiment that it, in order to determine the combustion lambda value of an internal combustion engine with at least two combustion chambers, can carry out the above described method.

With regard to the advantages of this control device, reference is made to the embodiments of the methods. The advantages mentioned there apply in an analogous manner.

The internal combustion engine 1 comprises a plurality of combustion chambers 30, which are in each case delimited by a cylinder 2 and a piston 3 that can move up and down (in FIG. 1 only one combustion chamber 30 is shown for reasons of improved clarity). Furthermore, the internal combustion engine 1 comprises an intake duct 7, in which a mass air flow sensor 5 and a throttle valve 6 are arranged downstream of an intake opening 4. The fresh air necessary for the combustion is introduced into the combustion chambers 30 by means of the intake duct 7, with the fresh air supply being controlled by means of the opening and the closing of inlet valves 8.

The internal combustion engine 1 shown here is an internal combustion engine 1 with direct fuel injection, in the case of which the fuel necessary for the combustion is in each case injected by means of an injection valve 9 directly into the combustion chamber 30 in question. Likewise, a spark plug 10 projecting into the combustion chamber 30 in question ignites the combustion in each case 10. The combustion exhaust gases are discharged by means of exhaust valves 11 into an exhaust gas duct 31 of the internal combustion engine 1 and purified by means of an exhaust gas catalytic converter 12 arranged in an exhaust gas duct 31.

The power is transmitted to a drivetrain of a motor vehicle (not shown) by means of a crankshaft 13 connected to the piston 3. Furthermore, the internal combustion engine 1 has a combustion chamber pressure sensor 14, a rotational speed sensor 15 for detecting the rotational speed of the crankshaft 13 as well as an exhaust gas temperature sensor 16 for detecting the exhaust gas temperature.

A fuel supply system is associated with the internal combustion engine 1, which has a fuel tank 17 as well as a fuel pump 18 arranged therein. The fuel pump 18 has the task of feeding the fuel to a pressure reservoir 20 via a supply line 19. In this process, the pressure reservoir 20 is embodied as a common pressure reservoir, from which the injection valves 9 are fed with pressurized fuel in the case of a plurality of combustion chambers 30. Furthermore, a fuel filter 21 and a high-pressure pump 22 are arranged in the supply line 19. The high-pressure pump 22 has the task of feeding the fuel supplied by the fuel pump 18 at a relatively low pressure (approximately 3 bar) to the pressure reservoir 20 at a high pressure (in the case of a spark ignition engine typically up to 150 bar). In this process, the high-pressure pump 22 is driven by means of an individual drive (not shown), for example an electric motor, or by means of a corresponding coupling with the crankshaft 13. In order to regulate the pressure in the pressure reservoir 20, a pressure adjusting means 23, for example a pressure control valve or a volume control valve is arranged in it, by means of which the fuel in the pressure reservoir 20 can flow back via a return-flow line 24 in the supply line 19 or the fuel tank 17. Furthermore, provision is made for a pressure sensor 25 in order to monitor the pressure in the pressure reservoir 20.

A control device 26 is associated with the internal combustion engine 1, said control device being connected to all the actuators and sensors by means of signal and data lines. In the control device 26, engine control functions based on the performance graph (KF1 to KF5) are implemented via software. Based on the standard values of the sensors and the engine control functions based on the performance graph, control signals are transmitted to the actuators of the internal combustion engine 1 and of the fuel supply system. In this way, the control device 26 is connected to the fuel pump 18, the pressure adjusting means 23, the pressure sensor 25, the mass air flow sensor 5, the throttle valve 6, the spark plug 10, the injection valve 9, the combustion chamber pressure sensor 14, the rotational speed sensor 15 and the exhaust gas temperature sensor 16 by means of the data and the signal lines.

The control device 26 determines on the basis of the signal of the rotational speed sensor 15 and/or the combustion chamber pressure sensor 14 for each of the combustion chambers 30, a combustion chamber-individual engine noise value ER, which represents a standard for the engine noise of the combustion chamber in question.

When using the signal of the combustion chamber pressure sensor 14, it is for example possible to compare the pressure curve in one of the combustion chambers 30 to the pressure curve in the other combustion chambers 30 in order to obtain an engine noise value ER by means of suitable extended mathematical operations.

Another procedure is to use the signal of the rotational speed sensor 15. The rotational speed sensor 15 scans a transmitting wheel 32 coupled with the crankshaft 13. In this process, a specific sector on the transmitting wheel 32 is associated with each combustion chamber 30. By means of the rotational speed sensor 15, the control device 26 calculates the rotary speed of the transmitting wheel 32 and evaluates said speed individually for the specific sectors of the combustion chamber. The speed, by means of which the sectors move past the rotational speed sensor 15, sets a standard for the torque contribution TQ of the relevant combustion chamber 30. By comparing the speeds by means of which the specific sectors of the combustion chamber of the transmitting wheel 32 pass, the rotational speed sensor 15 with an average value of these speeds, an individual engine noise value ER can be calculated for each combustion chamber 30. As a result, the individual engine noise values ER represent a standard for the torque contribution TQ of the combustion chamber 30 in question. At this point, reference is also made to EP 0 576 705 A1, which describes a method for determining the engine noise in more detail.

FIG. 2 shows schematically the combustion chamber-individual torque contribution TQ that depends on the combustion chamber-individual air/fuel ratio, referred to as $\lambda i$ in abbreviated form. As can be observed, the combustion chamber-individual torque contribution TQ reaches its maximum at approximately $\lambda i=0.9$. The produced torque TQ is reduced both in the case of a further enrichment, i.e. a shift towards lower lambda values and when said air/fuel ratio is made leaner, i.e. a shift towards higher lambda values.

The combustion lambda value $\lambda$ of the exhaust gas of an internal combustion engine 1 can be determined based on the engine noise values ER1, ER2 of two combustion chambers according to various embodiments. The way in which this functions, ought to be explained in more detail on the basis of FIGS. 3A to 3C in connection with FIG. 2.

From FIG. 2 it is evident that the combustion chamber-individual torque contribution TQ is influenced by changing the fuel quantity MFF metered to the combustion chamber 30 and for this reason the change in the combustion chamber-individual air/fuel ratio $\lambda i$ connected therewith.

In this case, the starting point is for example an internal combustion engine with four combustion chambers 30 as shown in FIG. 1, which is operated at a stationary operating point. An operating point is regarded as stationary when the torque generated by the internal combustion engine 1 lies within a predetermined tolerance band over a predetermined period of time. In this process, the rotational speed, the fresh air volume fed to the internal combustion engine 1 as well as the ignition points ought essentially to be constant for the combustion chambers. A certain combustion chamber-individual fuel quantity is metered to the four combustion chambers 30 in each case. As a result, there is for each combustion chamber 30, a certain combustion chamber-individual air/fuel ratio $\lambda i$ and by means of the combustion, a certain (initially unknown) combustion lambda value $\lambda$. If the fuel quantity of a combustion chamber 30 is now reduced by a certain amount and the fuel quantity of another combustion chamber is increased by the same amount, the combustion lambda value $\lambda$ does essentially remain constant, but the combustion chamber-individual air/fuel ratio $\lambda i$ changes and the combustion chamber-individual torque contribution TQ of these two combustion chambers changes. This leads to a change in the combustion chamber-individual engine noise value ERi determined by the control device 26.

Figure 3A:
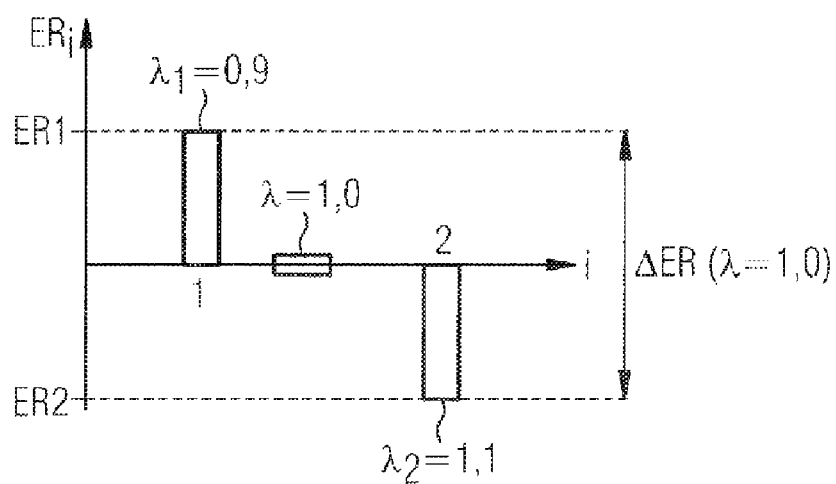
FIGS. 3A-3C show diagrams for the representation of the combustion chamber-individual engine noise in the case of a variation of the lambda value.
Figure 3B:
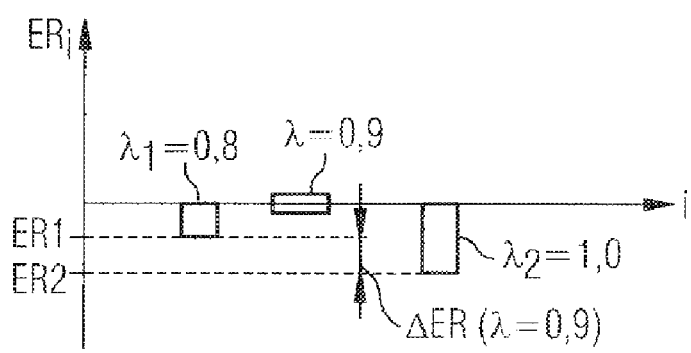
Figure 3C:
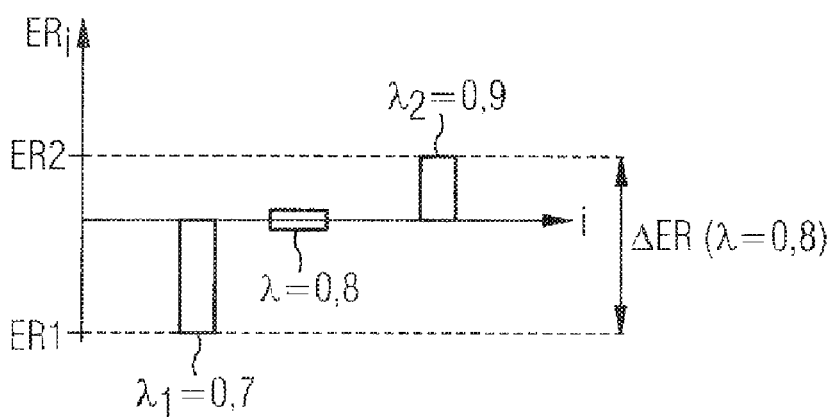

In the case of the above-described procedure, the combustion chamber-individual engine noise values ERi for the two combustion chambers (i=1 and i=2) shown in FIGS. 3A to 3C, result for different lambda values A of the exhaust gas.

FIG. 3A shows the resulting combustion chamber-individual engine noise values ERi in the case of a combustion lambda value $\lambda$ of 1.0. The fuel quantity of the first combustion chamber (i=1) is increased by the amount $\Delta$MFF so that a combustion chamber-individual air/fuel ratio $\lambda 1$ of 0.9 is set. Reducing the fuel quantity of the second combustion chamber (i=2) by the same amount $\Delta$MFF, results in a combustion chamber-individual air/fuel ratio $\lambda 1$ of 1.1. As is evident, by referring to FIG. 2, the combustion chamber-individual torque contribution TQ of the first combustion chamber thus increases, whereas the combustion chamber-individual torque contribution TQ of the second combustion chamber is reduced. This results in a higher engine noise value ER1 of the first combustion chamber and a reduced engine noise value ER2 of the second combustion chamber. In this case, the difference between the engine noise value ER1 and the engine noise value ER2 is $\Delta$ER($\lambda$=1.0).

For a combustion lambda value $\lambda$ of 0.9 and 0.8, in the case of the same procedure, the engine noise values ER1 and ER2 shown in FIGS. 3B and 3C and the resulting differences $\Delta$ER($\lambda$=0.9) and $\Delta$ER($\lambda$=0.8) are obtained, which differ from one another in terms of amount.

It is generally evident from FIGS. 3A to 3C that a characteristic pattern of the engine noise values ER1 and ER2 or a characteristic amount for the difference $\Delta$ER is obtained for a certain combustion lambda value $\lambda$. As a result, by implication of these characteristic patterns or differences $\Delta$ER, one may deduce the combustion lambda value $\lambda$ of the exhaust gas. The relation between the difference $\Delta$ER and the combustion lambda value $\lambda$ can for example be stored as a performance graph in the control device 26.

FIG. 4 shows a first embodiment of a method for determining the combustion lambda value $\lambda$ of the internal combustion engine 1 in the form of a sequence diagram.

The method starts in a step 400 for example on starting the internal combustion engine 1. In a step 401, a test is carried out in order to determine whether or not the internal combustion engine 1 is at a stationary operating point. In the case of a stationary operating point, a predetermined fuel quantity MFF is fed by means of the injection valves 9 to each combustion chamber 30. The interrogation in a step 401 is repeated until a stationary operating point is identified.

In a step 402, a combustion chamber-individual first fuel quantity MFF1 of a first combustion chamber is increased by a predetermined amount $\Delta$MFF. At the same time, a second fuel quantity MFF2 of a second combustion chamber is reduced by the same amount $\Delta$MFF. In this process, the total fuel quantity MFF fed to the combustion chambers 30 and as a result the combustion lambda value $\lambda$ remain. By increasing or reducing the individual fuel quantities MFF1, MFF2 for the first combustion chamber and the second combustion chamber, the combustion chamber-individual lambda value $\lambda 1$, $\lambda 2$ for these combustion chambers also changes. As has already been explained in FIG. 2, the combustion chamber-individual torque contribution or the torque produced in these combustion chambers in each case also changes. This change in the combustion chamber-individual torque contributions of the first combustion chamber and the second combustion chamber is detected by means of the rotational speed sensor 15. The signal of the rotational speed sensor 15 is used by the control device in order to calculate an engine noise value ER1, ER2 in a step 403 for the first combustion chamber and the second combustion chamber in each case.

In a step 404, the combustion lambda value $\lambda$ is determined based on the difference $\Delta$ER between the first engine noise value ER1 and the second engine noise value ER2. This for example is done by means of a performance graph, which reproduces the relation between the difference $\Delta$ER and the combustion lambda value $\lambda$ for this operating point. The performance graph can also be embodied as a multi-dimensional performance graph, with the relationship between the combustion lambda value $\lambda$ and the difference $\Delta$ER being plotted for a plurality of operating points of the internal combustion engine 1.

After the combustion lambda value $\lambda$ has been determined, the method can be started anew with step 400.

A further embodiment of the method is shown in FIG. 5. This embodiment proves to be particularly advantageous if the internal combustion engine 1 is to be operated with fuel quantity equalization. The objective of the fuel quantity equalization is to level the individual torque contributions TQ of the individual chambers 30. This improves the running smoothness of the internal combustion engine 1 and leads to a more uniform load and a more even wear of the internal combustion engine 1. The basic principle of the fuel quantity equalization consists in determining the torque contributions TQ of the individual combustion chambers 30 by evaluating the signal of the rotational speed sensor 15. A leveling of these torque contributions can be implemented by means of a corresponding dosing of the fuel quantities fed to the combustion chambers 30. Should it for example be established that one of the combustion chambers produces a lower torque than the average value of the torque contributions of the other combustion chambers, a richer mixture is produced by a corresponding increase in the fuel quantity supplied to it, which increases the torque output. The torque can also be reduced in an analogous manner, by reducing the fuel quantity of the combustion chamber in question. Finally, the fuel quantity equalization leads to different fuel quantities being fed to the individual combustion chambers 30.

The embodiment of the method in accordance with FIG. 5 now serves to improve the accuracy when determining the combustion lambda value $\lambda$ in the case of an internal combustion engine 1 with fuel quantity equalization. The steps 500 to 504 correspond to the steps 400 to 404 of the exemplary embodiment of FIG. 4. As single difference, the lambda value determined in a step 504 is not regarded as the final result, but as the lambda intermediate value $\lambda 1$ and stored.

In a subsequent step 505, the fuel quantity MFF1 of the first combustion chamber is reduced by the predetermined amount $\Delta$MFF. At the same time the second fuel quantity MFF2 of the second combustion chamber is increased by the same amount $\Delta$MFF. As a result, the variation in the fuel quantities MFF1, MFF2 metered is the reverse of a step 502.

In a step 506, the combustion chamber-individual engine noise values ER3 and ER4 are determined anew. This takes place in a similar manner as in the steps 503 and 403. In a step 507, a second lambda intermediate value $\lambda 2$ is determined based on the difference $\Delta$ER between the individual engine noise values ER3 and ER4 of the combustion chamber. On the other hand, this is done in an analogous manner to the steps 504 and 404 on the basis of a performance graph.

In a step 508, the combustion lambda value $\lambda$ is determined based on the first lambda intermediate value $\lambda 1$ and the second lambda intermediate value $\lambda 2$. This can for example take place by the formation of the arithmetic mean. The method either can end in a step 509 or alternatively be started anew.

By reversing the variation in the fuel quantities MFF1, MFF2 fed to the first combustion chamber and the second combustion chamber and the determination of two lambda intermediate values $\lambda 1$, $\lambda 2$, the accuracy of the determined combustion lambda value $\lambda$ can be markedly increased.

Even if in the exemplary embodiments of the method in accordance with FIGS. 3 and 4, the combustion lambda value $\lambda$ is determined based on the engine noise values of two combustion chambers, with a view to further increasing the accuracy of the method, engine noise values for different pairs of combustion chambers of the internal combustion engine can be determined and the final combustion lambda value $\lambda$ can be calculated from this, by forming an average value for example.

What is claimed is:

1. A method for the determination of the combustion lambda value of an internal combustion engine with at least two combustion chambers, with the method comprising the steps of:
   metering a predetermined first fuel quantity to the first combustion chamber and a predetermined second fuel quantity to the second combustion chamber,
   reducing the first fuel quantity by a predetermined amount and increasing the second fuel quantity being increased by the same predetermined amount,
   determining a first engine noise value, associated with the first combustion chamber, and a second engine noise value, associated with the second combustion chamber,
   determining the combustion lambda value based on the first engine noise value and the second engine noise value.

2. The method according to claim 1, wherein the combustion lambda value of the exhaust gas being determined based on the difference between the first engine noise value and the second engine noise value.

3. The method according to claim 1, wherein, after the determination of the first engine noise value and the second engine noise value,
   the first fuel quantity being increased by the predetermined amount and the second fuel quantity being decreased by the predetermined amount,
   a third engine noise value, associated with the first combustion chamber, and a fourth engine noise value, associated with the second combustion chamber, being determined,
   the combustion lambda value being determined based on the first engine noise value, the second engine noise value, the third engine noise value and the fourth engine noise value.

4. The method according to claim 3, wherein
   a first lambda intermediate value being determined based on the difference between the first engine noise value and the second engine noise value,
   a second lambda intermediate value being determined based on the difference between the third engine noise value and the fourth engine noise value, and
   the combustion lambda value is determined based on the first lambda intermediate value and the second lambda intermediate value.

5. The method according to claim 4, wherein the lambda value of the exhaust gas being calculated as the average value between the first lambda intermediate value and the second lambda intermediate value.

6. The method according to claim 1, wherein the combustion lambda value being determined by using at least one performance graph.

7. A control device for an internal combustion engine comprising at least two combustion chambers, wherein the control device, in order to determine the combustion lambda value of the internal combustion engine, being operable to:
   meter a predetermined first fuel quantity to the first combustion chamber and a predetermined second fuel quantity to the second combustion chamber,
   reduce the first fuel quantity by a predetermined amount and to increase the second fuel quantity by the same predetermined amount,
   determine a first engine noise value, associated with the first combustion chamber, and a second engine noise value, associated with the second combustion chamber, and
   to determine the combustion lambda value based on the first engine noise value and the second engine noise value.

8. The control device to claim 7, wherein the control device is operable to determine the combustion lambda value of the exhaust gas based on the difference between the first engine noise value and the second engine noise value.

9. The control device to claim 7, wherein the control device, after the determination of the first engine noise value and the second engine noise value, is operable to
   increase the first fuel quantity by the predetermined amount and to decrease the second fuel quantity by the predetermined amount,
   determine a third engine noise value, associated with the first combustion chamber, and a fourth engine noise value, associated with the second combustion chamber, and
   determine the combustion lambda value based on the first engine noise value, the second engine noise value, the third engine noise value and the fourth engine noise value.

10. The control device to claim 9, wherein the control device is operable to
    determine a first lambda intermediate value based on the difference between the first engine noise value and the second engine noise value,
    determine a second lambda intermediate value based on the difference between the third engine noise value and the fourth engine noise value, and
    determine the combustion lambda value based on the first lambda intermediate value and the second lambda intermediate value.

11. The control device to claim 10, wherein the control device is operable to calculate the lambda value of the exhaust gas as the average value between the first lambda intermediate value and the second lambda intermediate value.

12. The control device to claim 7, wherein the control device is operable to determine the combustion lambda value by using at least one performance graph.

13. A system for the determination of the combustion lambda value of an internal combustion engine with at least two combustion chambers, comprising:
    metering means for metering a predetermined first fuel quantity to the first combustion chamber and a predetermined second fuel quantity to the second combustion chamber,
    means for reducing the first fuel quantity by a predetermined amount and increasing the second fuel quantity by the same predetermined amount, means for determining a first engine noise value, associated with the first combustion chamber, and a second engine noise value, associated with the second combustion chamber, and means for determining the combustion lambda value based on the first engine noise value and the second engine noise value.

14. The system according to claim 13, wherein the combustion lambda value of the exhaust gas being determined based on the difference between the first engine noise value and the second engine noise value.

15. The system according to claim 13, wherein, after the determination of the first engine noise value and the second engine noise value, the first fuel quantity being increased by the predetermined amount and the second fuel quantity being decreased by the predetermined amount, a third engine noise value, associated with the first combustion chamber, and a fourth engine noise value, associated with the second combustion chamber, being determined, the combustion lambda value being determined based on the first engine noise value, the second engine noise value, the third engine noise value and the fourth engine noise value.

16. The system according to claim 15, wherein a first lambda intermediate value being determined based on the difference between the first engine noise value and the second engine noise value, a second lambda intermediate value being determined based on the difference between the third engine noise value and the fourth engine noise value, and the combustion lambda value is determined based on the first lambda intermediate value and the second lambda intermediate value.

17. The system according to claim 16, wherein the lambda value of the exhaust gas being calculated as the average value between the first lambda intermediate value and the second lambda intermediate value.

18. The system according to claim 13, wherein the combustion lambda value being determined by using at least one performance graph.

* * * * *